United States Patent

[11] 3,607,701

| [72] | Inventor | Peter J. Wheeler |
| | | Carshalton Beeches, England |
| [21] | Appl. No. | 696,060 |
| [22] | Filed | Jan. 5, 1968 |
| [45] | Patented | Sept. 21, 1971 |
| [73] | Assignee | Bailey Meters & Controls Limited |
| | | Purley Way, Croydon, Surrey, England |

[54] ELECTROCHEMICAL ANALYZER FOR MEASURING THE OXYGEN CONTENT OF HOT GASES
3 Claims, 4 Drawing Figs.

| [52] | U.S. Cl. | 204/195, 204/1 T |
| [51] | Int. Cl. | G01n 27/46 |
| [50] | Field of Search | 204/1.1, 195 |

[56] References Cited
UNITED STATES PATENTS

| 3,235,477 | 2/1966 | Keyser et al. | 204/195 |
| 3,282,803 | 11/1966 | Poepel et al. | 204/195 |
| 3,297,943 | 1/1967 | Morgan et al. | 204/195 |
| 3,336,215 | 8/1967 | Hagen | 204/195 |
| 3,400,054 | 9/1968 | Ruka et al. | 204/1.1 |
| 3,442,773 | 5/1969 | Wilson | 204/195 |
| 3,464,008 | 8/1969 | Meysson | 204/195 |

Primary Examiner—T. Tung
Attorney—John F. Luhrs

ABSTRACT: An analyzer for determining the oxygen content of a hot gas employing an electrochemical cell having one electrode disposed in the gas, the oxygen content of which it is desired to determine and the other electrode disposed in a reference gas of known oxygen content. The effect of temperature variations on the cell output is eliminated so that the cell may be operated in a varying temperature environment thus making it particularly adaptable for in situ applications.

PATENTED SEP 21 1971 3,607,701

INVENTOR.
PETER J. WHEELER
BY
John F. Luhrs
ATTORNEY

ELECTROCHEMICAL ANALYZER FOR MEASURING THE OXYGEN CONTENT OF HOT GASES

BACKGROUND OF THE INVENTION

This invention relates to improvements in apparatus for the detection and the continuous measurement of the oxygen content of hot gases in the approximate range of 500° C.–1000 C.

DESCRIPTION OF THE PRIOR ART

Various types of analyzers have been developed for determining the presence and amount of oxygen in gases. Included in such analyzers in one employing a concentration cell utilizing a solid-oxide electrolyte and having electrodes disposed on opposite surfaces. The EMF generated by such a cell varies directly with the absolute temperature thereof and the logarithm of the ratio of the oxygen partial pressures of the gases in which the electrodes are disposed. In devices presently available, cell EMF is measured directly and hence the cell temperature must be maintained constant. Further, as the EMF varies with the logarithm of the ration of the oxygen partial pressures, a nonlinear relationship exists between the EMF and the oxygen content of the gas.

SUMMARY OF THE INVENTION

In the electrochemical gas analyzer, the oxygen partial pressure of the reference gas is varied as required to maintain zero cell output. The pressure of the reference gas then varies in straight line relationship with the oxygen content in the sampled gas and is independent of cell temperature. My invention further comprehends compensating for cell temperature wherein the cell EMF after amplification energizes an electric circuit, the resistance of which varies with cell temperature and the current flow in the circuit thus becomes a measure of the oxygen partial pressure of the sampled gas, the variable resistance of the circuit with cell temperature acting to compensate for variations in cell temperature.

DESCRIPTION OF THE PREFERRED EMBODIMENT

Figure 1:
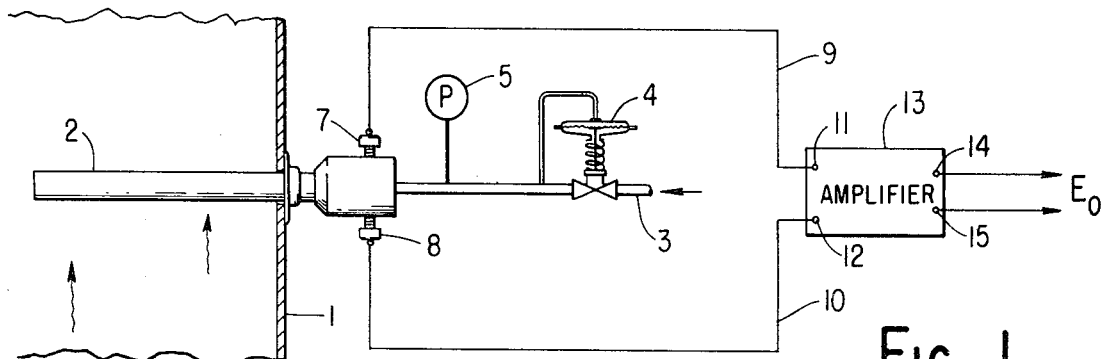
FIG. 1 illustrated in diagrammatic form one embodiment of my invention.

Referring to FIG. 1, there is shown in diagrammatic form an embodiment of my invention arranged to produce a control signal indicative of both the departure an the amount of departure of the percent in a gas from a predetermined value. I shown therein, in fragmentary form, a duct 1 through which a hot gas, such as flue gas, from a steam generator flows. It will be evident as the description proceeds that my invention is not limited to the detection and measurement of the percent oxygen in flue gases, but may be used to determine the oxygen content in any gas. To avoid an inference of my invention being limited to the detection and measurement of the oxygen in a particular gas, hereafter the gas, the oxygen content of which it is desired to determine, will be referred to as the "-sampled gas." It is the departure of the percent oxygen in the sampled gas from a predetermined value which the system shown in FIG. 1 detects and produces a control signal proportional thereto. The control signal may be used to perform any one of a number of functions such as alarming, recording and/or controlling. Where the sampled gas is a flue gas, the control signal may, for example, be used to adjust the fuel-air ratio of the burner or burners producing the flue gas to restore the percent oxygen to a predetermined value, or to shut off the fuel to avoid the occurrence of a hazardous condition when the percent oxygen decreases below a predetermined value.

Disposed in the duct 1 is an electrochemical cell 2 which may be similar to that shown and described in the copending application of L. R. Flais, Ser. No. 683,315 which was filed in the U.S. Patent Office on Nov. 15, 1967. The cell 2 generates an EMF varying in inverse relationship to the ratio of the oxygen partial pressures of the sampled gas in which the exterior surface of the cell is disposed and that of a reference gas which is admitted to the interior of the cell through a pipe 3 from any suitable source (not shown). The reference gas may, for example, be air having a partial pressure of 0.21 at atmospheric pressure or it may be a gas composed of nitrogen and oxygen in proportion to give an oxygen partial pressure corresponding to the oxygen partial pressure it is desired to maintain in the sampled gas. Conveniently, the oxygen partial pressure in the reference gas may also be obtained by varying the pressure of the reference gas. Thus, in FIG. 1, I show in the pipe 3 a pressure regulator 4 having an adjustable set point and a pressure gage 5. Regulator 4 may be set to maintain in the cell 2 a reference gas pressure which, with a known composition of the reference gas, establishes an oxygen partial pressure corresponding to the desired percent oxygen in the sampled gas.

The EMF generated by the cell 2 is brought to terminals 7 and 8 and thence through wires 9 and 10 respectively to the input terminals 11 and 12 of an amplifier 13 producing an output control signal. The control signal, as hereinbefore discussed, may be used to operate measuring and/or control devices either directly or through mechanisms such as on-off control switches and the like.

When the oxygen content in the sampled gas is equal to the oxygen content in the reference gas, the cell EMF will be zero, as the oxygen partial pressure of the sampled gas will be equal to that of the reference gas. An increase in oxygen in the sampled gas above that in the reference gas will produce a cell output of one polarity; and conversely, a decrease in the oxygen in the sampled gas below that in the reference gas will produce a cell output of opposite polarity.

Figure 2:
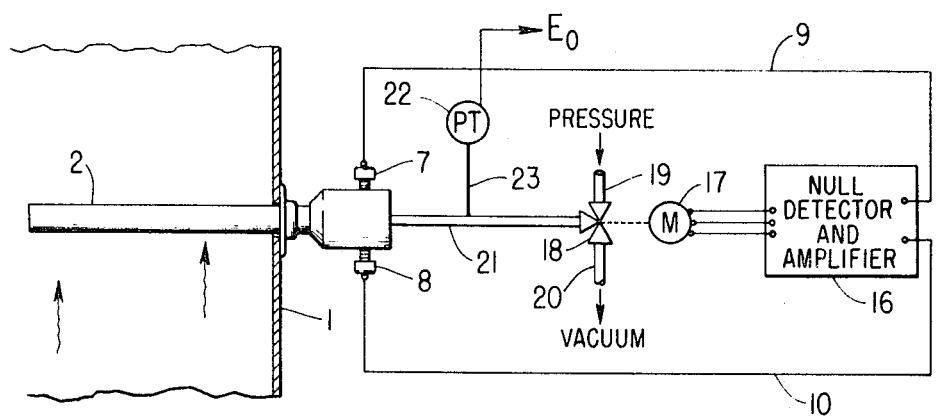
FIG. 2 illustrates in diagrammatic form another embodiment of my invention.

In FIG. 2, I show another embodiment of my invention wherein the pressure of the reference gas is varied to maintain the partial pressure of the oxygen in the reference gas equal to the partial pressure of the oxygen in the sampled gas. The pressure of the reference gas thus becomes a direct measure of the percent oxygen in the sampled gas. This will be evident from a consideration of the Nernst Equation which states the relationship between cell output, cell temperature and oxygen partial pressures. Thus:

$$E = CT \log (P_1)/\text{ti } P_2$$

Where:

$E$ is cell EMF $C$ is a constant $T$ is the absolute temperature of the cell $P_1$ is the oxygen partial pressure at one cell electrode $P_2$ is the oxygen partial pressure at the other electrode It is evident when $E$ is zero, $P_1$ must equal $P_2$ and hence the oxygen partial pressure of the reference gas is equal to the oxygen partial pressure of the sampled gas and may be used directly as a measure of the percent oxygen in the sampled gas.

As shown in FIG. 2, the cell EMF output is conducted through leads 9 and 10 to a null detector and amplifier 16 arranged to operate a servomotor such as a motor 17 to position a three-way proportioning valve 18. The valve 18 is connected to a reference gas under pressure through a pipe 19 and to a vacuum source through a pipe 20. Thus, the pressure of the reference gas introduced into the cell 2 through pipe 21 may be varied as required to maintain the cell EMF at zero. The pressure of the reference gas is caused to generate a control signal ($E_0$) by means of a pressure transducer 22 connected to pipe 21 through a pipe 23. This control signal may be used for any one or more functions such as to actuate a controller, an alarm, an indicator or a recorder.

It will be evident that in the system shown in FIG. 2, a "positive" signal from the cell; that is, when the oxygen content of the sampled gas is higher than the reference gas partial pressure, the valve 18 will operate to increase the reference gas pressure in the cell thus increasing the oxygen partial pressure of the reference gas until the input signal to the null detector and amplifier 16 is zero; that is, when the partial pressure of oxygen in the reference gas is equal to that in the sampled gas. By varying the pressure range applied to the cell, various ranges of oxygen content measurement may be obtained. Thus, with a pressure transducer sensitive over the range from zero to one atmosphere absolute pressure, a range of oxygen content in the sampled gas from 0 to 21 percent may be detected. If the range of the pressure transducer is restricted, a restricted range of oxygen content may be detected, in a direct proportional relationship with greater sensitivity. Thus, if the pressure transducer is sensitive over the range 0 to 0.2 atmospheres absolute pressure, a range of oxygen content in the sampled gas from 0 to 4.2 percent may be detected. Alternatively, instead of air at less than atmospheric pressure, a mixture of gases such as 0.5 percent oxygen mixed with 99.5 percent nitrogen at a pressure of say 100 p.s.i. may be utilized. With reference gas of this composition, a pressure range within the cell of 1–5 atmospheres (absolute) would correspond to an oxygen content in the sampled gas of between 0.5 percent and 2.5 percent.

Figure 3:
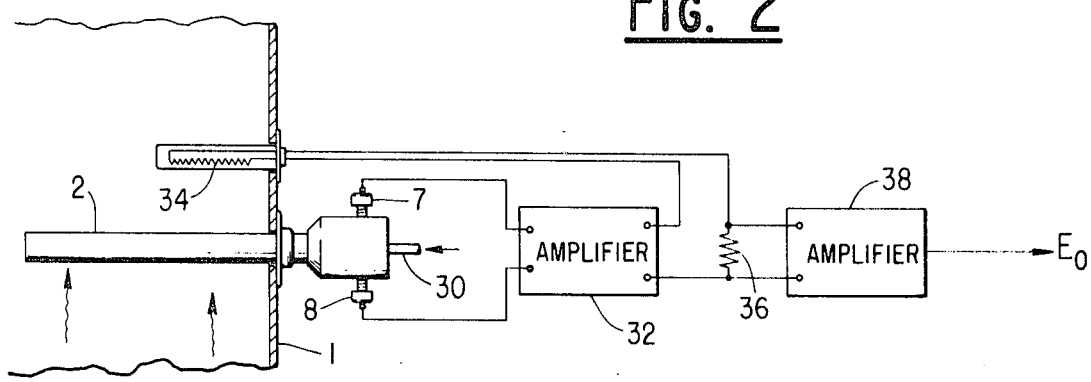
FIG. 3 illustrates in diagrammatic form still another embodiment of my invention.

In the embodiment of my invention shown in FIG. 3, in which an output signal from the electrodes of the cell is automatically temperature compensated, the cell is filled with a reference gas having a known oxygen content which may be conveniently introduced into the cell through a pipe 30. The output from the cell, which is proportional to the logarithm of the ratio of the partial pressures of the two oxygen contents multiplied by the absolute temperature, is fed to an amplifier 32 arranged to operate as a "constant voltage" amplifier generating an output voltage directly proportional to its input voltage regardless of changes in amplifier load within specified limits. The amplifier output voltage is applied to a circuit including a temperature compensating resistor 34 subjected to the same temperature as the cell 2 and a low resistance shunt 36 connected in series. The resistor 34 is of a material, such as platinum, having a resistance directly proportional to absolute temperature over the working range of the cell. Therefore, if the resistance of shunt 36 can be neglected in comparison with the resistance of the resistor 34, the current through the circuit for a given oxygen content will be independent of temperature since any change in the cell electromotive force due to temperature change will be accompanied by a change in resistance of resistance 34 in exactly the same ratio. In order to derive a useful output signal from the circuit, a second amplifier 38 may be used to amplify the voltage drop across the low resistance shunt. While in FIG. 3, for illustrative purposes, I have shown the resistance 34 physically separated from the cell 2, it will be evident that it may be mounted within the cell 2 if desired.

Figure 4:
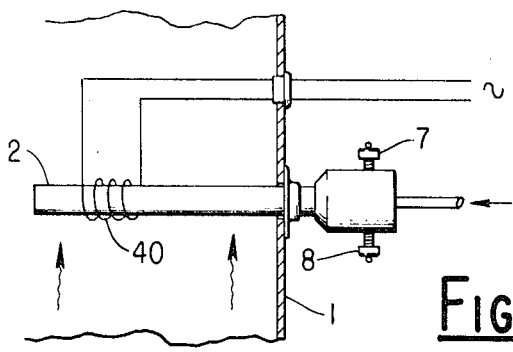
FIG. 4 is a fragmentary view of a modification which may be incorporated in any one of the embodiments of my invention shown in FIG. 1, 2 or 3.

Below a minimum temperature, approximately 500° C., the output of an electrochemical cell becomes negligible. In cases where the temperature of the sampled gas may go below this value, an auxiliary heater such as shown at 40 in FIG. 4 may be incorporated in the cell assembly to maintain the cell temperature above this minimum. It will be evident that this feature may be incorporated in any one of the embodiments of my invention shown in FIG. 1, 2 or 3.

What I claim as new and desire to secure by Letters Patent of the United States is:

1. An analyzer for producing an output signal corresponding to the deviation of the oxygen content in a sampled gas from a predetermined value, comprising in combination, a solid electrolyte cell producing an EMF varying as the ratio between the oxygen partial pressures of a reference gas and a sampled gas in which the cell is disposed means for adjusting the pressure of said reference gas to a set point pressure to produce a constant oxygen partial pressure in said reference gas corresponding to the desired oxygen content in the sampled gas, an amplifier producing an output signal corresponding to the EMF produced by said cell, an electric circuit including a first resistor and a second resistor connected in series to said amplifier output signal, said first resistor being disposed in the sampled gas adjacent to said cell and having a positive temperature coefficient such that its resistance is substantially proportional to the temperature of the gas and said second resistor having a substantially zero temperature coefficient, and means for measuring the voltage across said second resistor as an indication of the oxygen content in the sampled gas.

2. An analyzer for determining percent oxygen as set forth in claim 1, wherein said means for adjusting the pressure includes a pressure regulator adjustable to maintain a constant pressure in the reference gas indicative of desired oxygen level in the sampled gas.

3. An analyzer for determining the oxygen content in a flowing gas of variable temperature, comprising in combination, a solid electrolyte cell disposed in said flowing gas producing an EMF varying both in accordance with said oxygen content and the temperature of the flowing gas, an amplifier responsive to said EMF generating an output voltage proportional to said EMF, an electric circuit including a first resistor and a second resistor connected in series across said output voltage, said first resistor disposed in said gas stream adjacent to said cell having a positive temperature coefficient such that its resistance is substantially proportional to the temperature of said gas and said second resistor having a substantially zero temperature coefficient and means for measuring the voltage across said second resistor as an indication of the oxygen content in said flowing gas.